(12) United States Patent
Ebbole et al.

(10) Patent No.: US 12,056,344 B2
(45) Date of Patent: Aug. 6, 2024

(54) OUT-OF-PROCESS HIT-TESTING FOR ELECTRONIC DEVICES

(71) Applicant: Apple Inc., Cupertino, CA (US)

(72) Inventors: Mark A. Ebbole, San Francisco, CA (US); Andrew T. Finke, San Francisco, CA (US); Abhinay Ashutosh, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/217,498

(22) Filed: Jun. 30, 2023

(65) Prior Publication Data
US 2024/0004538 A1 Jan. 4, 2024

Related U.S. Application Data

(60) Provisional application No. 63/470,952, filed on Jun. 4, 2023, provisional application No. 63/470,955, filed on Jun. 4, 2023, provisional application No. 63/449,945, filed on Mar. 3, 2023, provisional application No. 63/402,435, filed on Aug. 30, 2022, provisional application No. 63/358,070, filed on Jul. 1, 2022.

(51) Int. Cl.
G06F 3/048 (2013.01)
G06F 3/0481 (2022.01)
G06F 3/04847 (2022.01)

(52) U.S. Cl.
CPC ........ *G06F 3/04847* (2013.01); *G06F 3/0481* (2013.01)

(58) Field of Classification Search
None
See application file for complete search history.

(56) References Cited

U.S. PATENT DOCUMENTS

| | | | |
|---|---|---|---|
| 5,825,352 A | 10/1998 | Bisset et al. | |
| 9,792,018 B2 | 10/2017 | Van Os et al. | |
| 11,334,147 B1 | 5/2022 | Upchurch | |
| 11,580,701 B2* | 2/2023 | Chaurasia | G06F 3/013 |
| 11,592,899 B1* | 2/2023 | Haine | G06F 3/0482 |
| 11,698,720 B2* | 7/2023 | Kang | H04W 8/24 715/788 |
| 11,816,262 B1* | 11/2023 | Kinkade | G06F 3/013 |
| 2019/0188895 A1 | 6/2019 | Miller, IV et al. | |
| 2021/0113922 A1 | 4/2021 | Summa et al. | |
| 2021/0325960 A1* | 10/2021 | Iglesias | G06F 3/0484 |

OTHER PUBLICATIONS

International Search Report and Written Opinion from PCT/US2023/026509, dated Oct. 17, 2023, 14 pages.

* cited by examiner

*Primary Examiner* — Thanh T Vu
(74) *Attorney, Agent, or Firm* — BAKERHOSTETLER

(57) ABSTRACT

Out-of-process hit-testing can provide increased privacy and efficiency in computer user input systems. In an aspect, an application specifies a control style for a UI window to be managed separately from the application, such as by a system process running outside of the application process. When a user input is received at a location corresponding to a part of the application UI that is separate from the UI window for which the control style has been specified, the user input may be redirected to the UI window for which the control style has been specified.

20 Claims, 7 Drawing Sheets

OUT-OF-PROCESS HIT-TESTING FOR ELECTRONIC DEVICES

CROSS REFERENCE TO RELATED APPLICATIONS

This application claims the benefit of priority to: U.S. Provisional Patent Application No. 63/358,070, entitled, "OUT-OF-PROCESS EFFECTS FOR ELECTRONIC DEVICES", filed on Jul. 1, 2022; U.S. Provisional Patent Application No. 63/402,435, entitled, "OUT-OF-PROCESS EFFECTS FOR ELECTRONIC DEVICES", filed on Aug. 30, 2022; U.S. Provisional Patent Application No. 63/449,945, entitled, "OUT-OF-PROCESS AUDIO EFFECTS FOR ELECTRONIC DEVICES", filed on Mar. 3, 2023; U.S. Provisional Patent Application No. 63/470,952, entitled, "OUT-OF-PROCESS EFFECTS FOR ELECTRONIC DEVICES", filed on Jun. 4, 2023; and U.S. Provisional Patent Application No. 63/470,955, entitled, "OUT-OF-PROCESS HIT-TESTING FOR ELECTRONIC DEVICES", filed on Jun. 4, 2023, the disclosure of each which is hereby incorporated herein in its entirety.

TECHNICAL FIELD

This disclosure relates to human-computer interface technologies and computer privacy including, for example, to out-of-process hit-testing for electronic devices.

BACKGROUND

Operating system software generally provides an abstraction layer between user interface hardware and applications that run on top of the operating system. Multiple applications with corresponding user interface windows can be presented on a display managed by an operating system.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
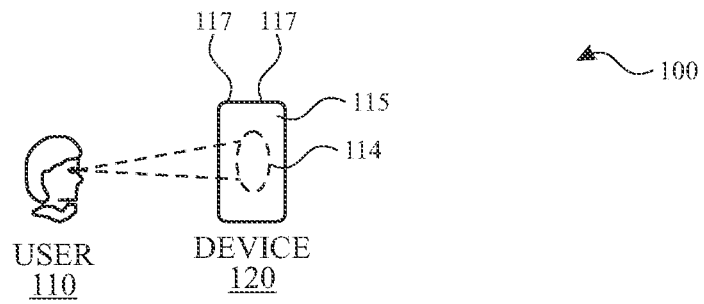
FIG. 1 illustrates an example environment for practicing aspects of this disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of this disclosure include techniques for providing increased privacy and/or efficiency in computer user input systems. While any computer input system may benefit from these techniques, systems that are capable of capturing personally identifiable user data, such as extended reality systems that track a user's hand gestures and/or eye gaze location, may particularly benefit from these techniques.

In an aspect of this disclosure, a user input and rendering system may receive and render user input, and may filter the user input available to a computer software application (or "app" herein). User input filtering enables a user's privacy from the application at least by restricting the application's access to the user's filtered input data. In some aspects, a computer user input and rendering system may be more trusted than an application running on the same computer because, for example the user input and rendering system is provided by a trusted operating system vendor, while the application is provided by a less trusted third-party application vendor. Moreover, a user may explicitly provide an authorization to the operating system to access user input information, and may not provide the same authorization to an application, such as a third part application.

In an aspect, a user may receive rendered feedback of the user's preliminary interactions with a user interface element, such a button or scroll bar, without making the preliminary interactions available to the application itself. Preliminary interactions with a UI element may include a user's intentional initial interactions with a user interface, such as exploration of the application's interface (for example to discover that a rectangle with a square inside is actually a scroll bar), and preliminary interactions may also include unintentional and even unconscious interactions with UI elements of the application (e.g., as the user's eyes move across a user interface without the user attending to the user interface).

Aspects of this disclosure provide techniques for efficiently retaining privacy of a user's preliminary UI interactions from an application while still providing rendered feedback of the preliminary interactions to the user. Rendered feedback of a preliminary interaction with a UI element might include, for example, a rendered audio cue when a hand gesture occurs near a UI element, or a UI element may start to glow when a user's gaze location is near or hovers near the UI element. In an aspect, when it is determined that a user intends to interact with an application (or a UI element of the application), then the user input may be considered no longer to be preliminary, and some user input may be provided to the application. In an aspect, an application may make a declaration or definition of a rendered feedback effect of preliminary interactions with a UI element before preliminary interactions occur, giving the application control over the nature of the preliminary interaction feedback effect, even when the application never learns of a preliminary interaction with its UI elements. The application may provide a declaration or definition of the effect to an operating system or another software component for managing rendering of the preliminary interactions. When the rendering of the effect is managed in a separate operating system process from the application providing the declaration or definition of the effect, the effect is referred to herein as a remote effect or an "out-of-process effect". As described herein in connection with various examples and/or use cases, a separate operating system process from an application may provide, on behalf of the application, other out-of-process services, without providing information about the out-of-process services to the application (e.g., including out-of-process hit-testing, which can include out-of-process hit-testing redirecting, as described in further detail hereinafter).

As noted above, aspects of this disclosure may be applied to extended reality systems. A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, user input may include tracking of a person's physical motions, and, in response the XR system may render an adjustment to one or more characteristics of one or more virtual objects simulated in the XR in a manner that comports with at least one law of physics. For example, if a user's hand gesture is rendered in an XR system at a location near but not touching a rendered application UI element, the UI element may be rendered with a glow or jiggle or otherwise indicate a preliminary interaction with that UI element without notifying the application of the preliminary user interaction. In an alternate example, if a user's hand gesture touches or grasps the UI element, it may be determined that the user deliberately intended to interact with the UI element, and then the user input indicating a touch or grasp of the UI element may be provided to the application.

Many different types of electronic user input and rendering systems may enable a human user to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Aspects of this disclosure provide rendered confirmation to a user of user engagement with an application user interface prior to providing user input to the application. A user interface (UI) may be displayed to appear at a location in a physical environment that is remote from a user input device and/or remote from the display device that displays the user interface (e.g., in a three-dimensional XR display environment). For example, physical movement of a mouse input device may be rendered as movement of a mouse cursor on a display at a different physical location (perhaps just a few inches) from the physical mouse. As another example, a gaze cursor may indicate the location of a user's gaze, the location of the user's gaze being remote from one or more eye-facing cameras that are used to determine the gaze location. Similarly, a hand gesture may be rendered as a hand object in a virtual space and presented to a user. Thus, a rendered effect of user input may be rendered or presented to a user at a location that is physically separated from the physical location of the sensor that obtained sensed user input. In a virtual space or other extended reality environment, the user input may also occur at a location that is remote from the display component that displays an application UI and/or a representation of the user's hand to appear to the user to be at a location remote from the display component.

Moreover, a user may move their hand and/or direct their gaze at or near a rendered application user interface without intending to interact with the application UI (e.g., due to normal motion of the user around the physical environment, such as during a conversation with another person unassociated with the electronic device), and/or may perform hand gestures for interaction with one displayed application UI that are not intended to be provided to an application associated with another displayed application UI.

Aspects of the disclosure include receiving, at a system process of an electronic device from an application running on the electronic device, a definition of an effect for a first user interface (UI) element managed by the application. While the first user interface element is displayed by the electronic device without the effect applied to the first user interface element, the system process may receive a user input. In response to a determination that the user input corresponds to the first user interface element displayed without the effect, rendering, by the system process and without providing the user input to the application, the effect on the first UI element according to the definition.

FIG. 1 illustrates an example environment 100 for practicing aspects of this disclosure. In example environment 100, a user 110 interacts with a computing device 120 having a display 115. As shown, the computing device 120 may include one or more speakers, such as speakers 117 (e.g., multiple speakers operable to generate spatialized audio that is perceived, by the user 110 to be emanating from a location, separate from the location of the speakers 117, in the physical environment of the user 110. In one or more examples described herein, user 110 may gaze at computing device 120, and the device may sense a gaze location 114 of the user. In one or more implementations, the user's gaze location my constitute a user input to the device.

The computing device 120 may be a smart phone, a tablet device, or a wearable device such as a smart watch or a head mountable portable system, that includes a display system capable of presenting a visualization of an extended reality environment to the user 110. The computing device 120 may be powered with a battery and/or any other power supply incorporated into the computing device 120 and/or coupled to the computing device 120 (e.g., by a cable). In an example, the display system of the computing device 120 provides a stereoscopic presentation of the extended reality environment, enabling a three-dimensional visual display of a rendering of a particular scene, to the user. In one or more implementations, instead of, or in addition to, utilizing the computing device 120 to access an extended reality environment.

The computing device 120 may include one or more cameras (e.g., visible light cameras, infrared cameras, etc.) Further, the computing device 120 may include various sensors that can detect user input including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the computing device 120 may include hardware elements that can receive user input such as hardware buttons or switches. User input detected by such sensors and/or hardware elements correspond to various input modalities for interacting with virtual content displayed within a given extended reality environment. For example, such input modalities may include, but not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The computing device 120 may also detect and/or classify physical objects in the physical environment of the computing device 120.

In one or more implementations, the computing device 120 may be communicatively coupled to a base device. Such a base device may, in general, include more computing resources and/or available power in comparison with the computing device 120. In an example, the computing device 120 may operate in various modes. For instance, the computing device 120 can operate in a standalone mode independent of any base device.

The computing device 120 may also operate in a wireless tethered mode (e.g., connected via a wireless connection with a base device), working in conjunction with a given base device. The computing device 120 may also work in a connected mode where the computing device 120 is physically connected to a base device (e.g., via a cable or some other physical connector) and may utilize power resources provided by the base device (e.g., where the base device is charging the computing device 120 and/or providing power to the computing device 120 while physically connected).

When the computing device 120 operates in the wireless tethered mode or the connected mode, a least a portion of processing user inputs and/or rendering the extended reality environment may be offloaded to the base device thereby reducing processing burdens on the computing device 120. For instance, in an implementation, the computing device 120 works in conjunction with a base device to generate an extended reality environment including physical and/or virtual objects that enables different forms of interaction (e.g., visual, auditory, and/or physical or tactile interaction) between the user and the extended reality environment in a real-time manner. In an example, the computing device 120 provides a rendering of a scene corresponding to the extended reality environment that can be perceived by the user and interacted with in a real-time manner. Additionally, as part of presenting the rendered scene, the computing device 120 may provide sound, and/or haptic or tactile feedback to the user. The content of a given rendered scene may be dependent on available processing capability, network availability and capacity, available battery power, and current system workload.

The computing device 120 may also detect events that have occurred within the scene of the extended reality environment. Examples of such events include detecting a presence of a living being such as a person or a pet, a particular person, entity, or object in the scene.

Figure 2:
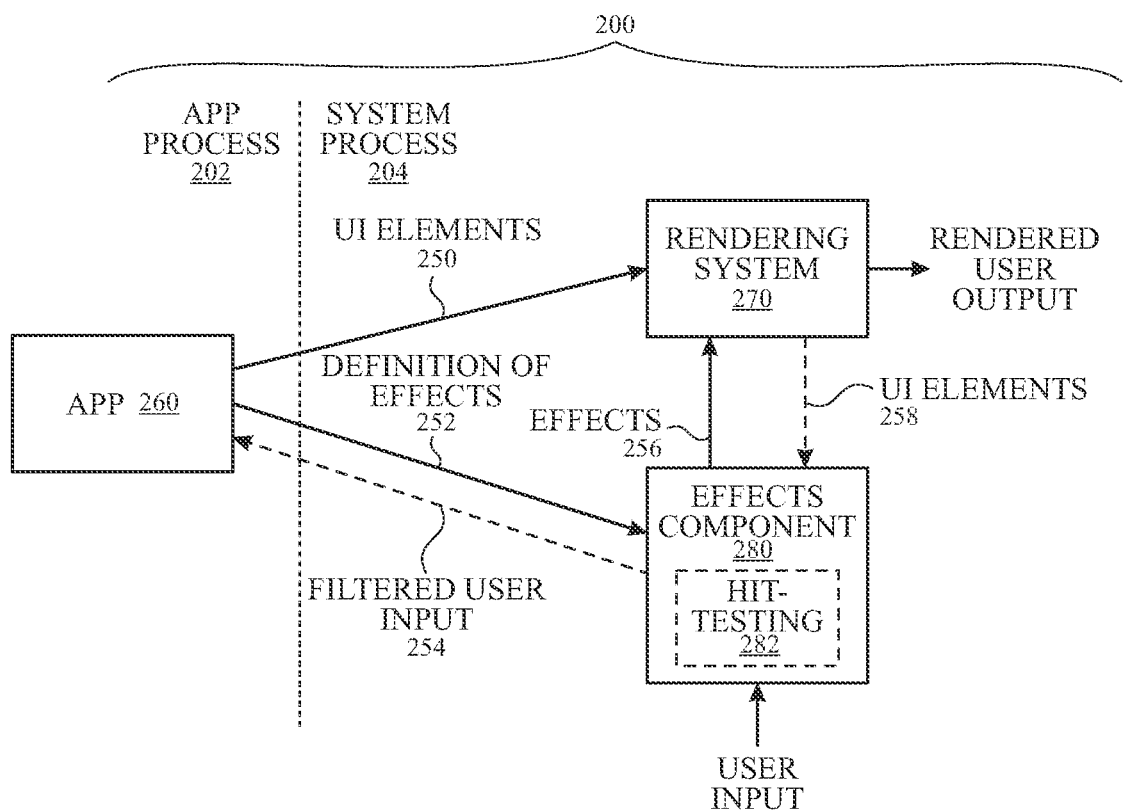
FIG. 2 illustrates an example system for providing out-of-process hit-testing, in accordance with aspects of the subject disclosure.

FIG. 2 illustrates an example system 200 for providing out-of-process effects. System 200 may be implemented, for example, on computing device 120. System 200 includes an application (app) process 202 corresponding to an application (app) 260, and a system process 204, including rendering system 270 (e.g., a rendering process) and an effects component 280 (e.g., an effects process). In some aspects, processes 202 and 204 may be separate processes run on a common device, such as computing device 120, or on separate devices. Aspects of the system process 204 (e.g., including the rendering system 270, the effects component 280, and/or hit-testing 282) may be implemented in hardware, software, or a combination thereof.

As depicted in FIG. 2, system process 204 includes both rendering system 270 and effects component 280. However, this disclosure is not so limited. For example, rendering system 270 may run in a separate process from the effects component 280, the rendering system 270 and the effects component 280 may be implemented in a common process, or the rendering system 270 and effects component 280 may be further distributed to run in more than two processes, all of which may be separate from app process 202. Similarly, in other aspects, app 260 may be distributed to run in more than one app process. Processes, such as app process 202 and system process 204, may provide security and/or privacy between the processes when running on a common device, such as computing device 120 of FIG. 1 or the computing device of FIG. 10. For example, app process 202 and system process 204 may operate with different virtual memory spaces as controlled by an operating system and enforced by a processor's memory controller hardware. Separate app and system processes may help prevent app 260 from accessing data inside system process 204. In other aspects, system process 204, rendering system 270 and effects component 280 may include one or more operating system drivers that do not run in a virtual memory space.

Operation of system 200 may include receiving a user input, and outputting a rendered effect as feedback of the user input, and this may be performed outside of the app process 202 and without knowledge of app 260. App 260 may provide a description of its UI element(s) 250 to rendering system 270, and app 260 may provide a definition of its effects 252 to be rendered in response to future user input. App 260 may also provide a definition of a control style for one or more portion of a UI of the app 260. When effects component 280 receives user input corresponding to a definition of effects received from app 260, effects component 280 may cause effects 256 to be rendered by rendering system 270 as user output. When effects component 280 receives user input at a particular location while a UI window or UI element is displayed that has a control style defined by the app 260, the effects component 280 may redirect a user input to associated with another portion of the UI to the UI window or UI element having the defined control style (e.g., a foreground style).

In optional aspects of system 200, effects component 280 may learn of a location of a UI element (e.g., a location of a button or scroll bar), for example directly from the app 260 or via optional UI elements 258 message from rendering system 270. In one or more implementations, effects component 280 may then perform optional hit-testing 282 between a current location of a UI element and a current location of a user input. In one or more other implementations, hit-testing 282 may be performed by another system process that is separate from the effects component 280 and that performs hit-testing for multiple different purposes (e.g., for the effects component 280 and other components and/or processes). When a particular user input is identified as being associated with a particular UI element by hit-testing 282 (e.g., by the effects component 280 or another system process of the computing device 120) between a user input and a particular UI element of an app 260, hit-testing 282 may identify a preliminary interaction with the particular UI element of the app 260. When a preliminary interaction is identified, effects 256 may be rendered as user output without notifying app 260 of the user input or the identified interaction. Alternately, when an alternate user input is identified as a confirmed interaction by a user with a UI element, then effects component 280 or another system process may notify app 260 of the confirmed interaction as filtered user input message 254.

The definition of effects 252 may describe a variety of effects that an app instructs the system process 204 to render on one or more UI elements. Each effect defined in the definition of effects 252 may correspond to a certain type of user input interaction with a particular UI element. In aspects, the definition of effects 252 may describe a plurality of effects to be rendered in response to a single user input interaction with a single UI element. For example, definition of effects 252 may indicate that when a user's gaze is within a certain range of a particular button UI element, the button will start to glow to a certain brightness level and/or emit a sound, and when a gaze is in a closer distance range to the button, the UI element may both glow at a brighter level and also wiggle and/or generate a buzzing sound, and when a gaze is in a third closest range (perhaps gazing directly at the button and/or gazing directly at the button for at least a predefined dwell time, such as one second, one half second, one tenth of a second, or a smaller fraction of a second), the user interaction may be identified as a confirmed interaction.

In an alternate optional aspects, app 260 may provide effects component 280 with information describing the UI element of the app 260 directly (e.g., instead of the effects component 280 receiving UI information from the rendering system 270). Additionally, instead of hit-testing based on location, hit-testing 282 may more generally determine that a certain user input corresponds to an interaction with a particular user interface element. For example, a user's verbal audio input saying "the red button" may cause the hit-testing 282 to associate that audio input with a red button UI element.

In an aspect, a definition of an effect 252 may be a declarative definition. In this aspect, app 260 may provide all information necessary for a software component outside of app process 202, such as effects component 280, to cause the app's desired effect to be rendered without the app's knowledge or further participation. A declarative definition of an effect may include an identification of a UI element, for example provided by a user interface framework or the operating system, an identification of a triggering user input, and an identification of an effect to be rendered when the triggering user input corresponds to the first UI element. In one or more implementations, the UI element may be vended from one or more files, such as a Universal Scene Description (USDZ) file. In another implementation, the UI element referenced in the app's declarative definition may be provided by the operating system. In one or more implementations, the definition of effects 252 may include one or more definitions of control styles for one or more respective UI windows and/or UI elements. For example, a declarative definition of a control style may include an identification of a UI window and/or UI element to which the control style applies, an identification of one or more triggering user input that may occur away from the UI window and/or UI element to which the control style applies, and redirection instructions for redirecting the user input to the UI window and/or UI element to which the control style applies when the triggering user input is received. In one or more other implementations, the control style may be a control style flag or other value or parameter that indicates that any user input with other portions of an application UI should be redirected to the UI window and/or UI element to which the control style applies whenever the UI window and/or UI element to which the control style applies is displayed.

Figure 3:
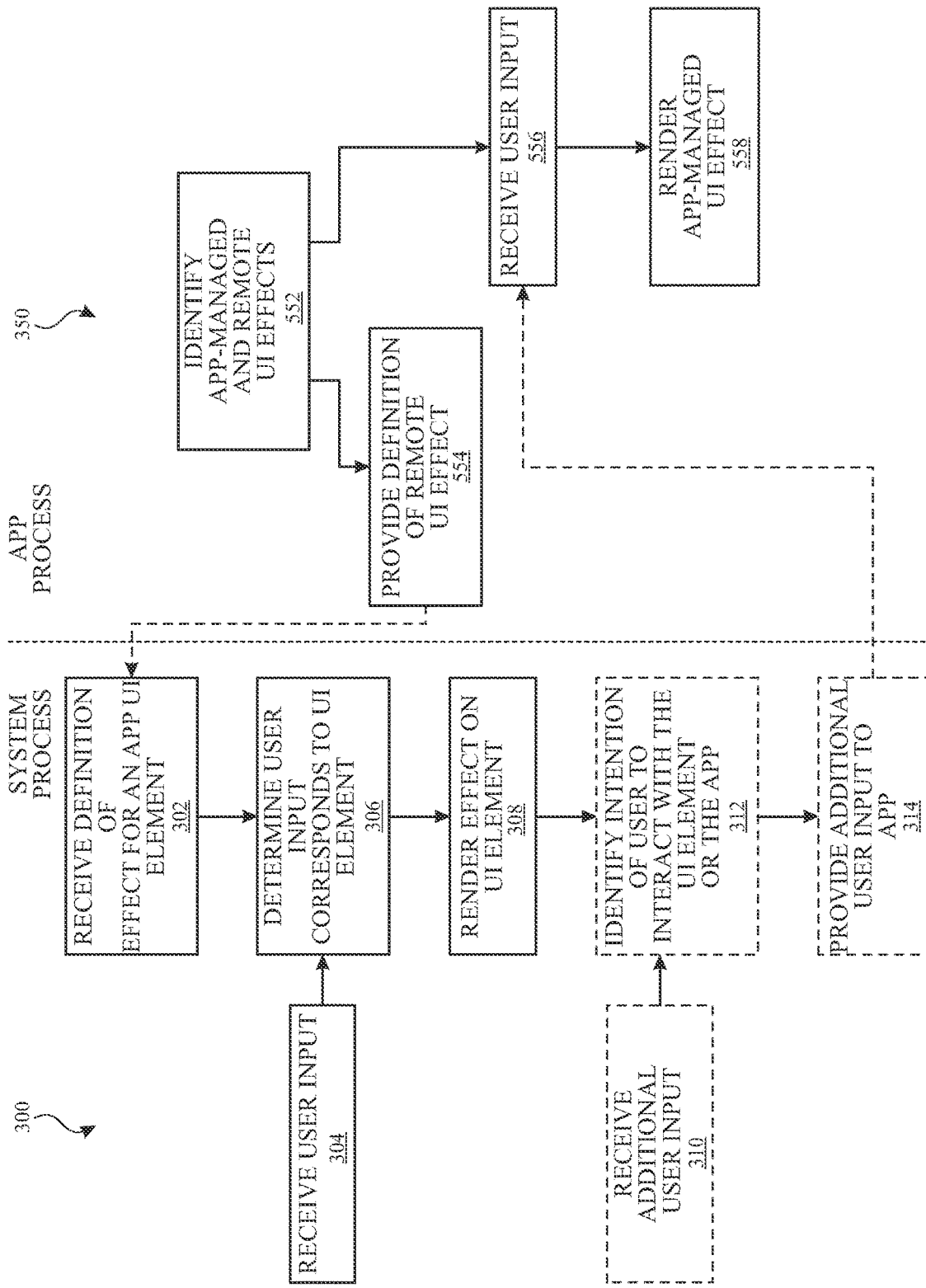
FIGS. 3A and 3B illustrate example methods for providing out-of-process UI services, in accordance with aspects of the subject disclosure.

FIG. 3A illustrates an example method for rendering UI effects. As shown, the method of FIG. 3A may include receiving, at a system process 300 (e.g., an implementation of the system process 204 of FIG. 2), a definition of an effect for a UI element of an app (box 302). One or more definitions of one or more control styles may also be received at box 302. User input may be received (box 304) by the system process 300, and when it is determined (e.g., by the system process 300, such as by performing hit-testing 282) that the received user input corresponds to the UI element of the received effect definition (box 306), then the effect may be rendered (e.g., by the system process 300) on the UI element (box 308) according to the effect definition. In an aspect, the operations of FIG. 3A may be performed in a system process 300, separate from an app process 350 (e.g., an implementation of the app process 204) in which the app runs.

The method of FIG. 3A may include optional additional operations, such as receiving, by the system process 300, additional user input (box 310), different from the user input received in box 304. When a user's intention to interact with the app or a UI element of the app is identified (box 312) by the system process 300 (e.g., by performing hit-testing 282), based on the original user input and/or the additional user input, some or all of the user input with which the user intention was identified may be optionally provided from the system process 300 to (or otherwise made available to) the app process 350 (box 314). In one or more use cases, the user input maybe provided to the app process 350 in connection with the UI element of the app for which the user's intention to interact with the app or a UI element of the app is identified. In one or more other use cases, a foreground UI window or foreground UI element may be displayed for which a foreground control style definition was provided to the system process 300 (e.g., at box 302), and some or all of the user input with which the user intention was identified may be provided from the system process 300 to (or otherwise made available to) the app process 350 (box 314) in connection with the foreground UI window or the foreground UI element (e.g., even if the user input was identified as being intended for interaction with another UI element or UI window).

The UI element referenced throughout FIGS. 3A and 3B may be part of an app's user interface. For example, the UI element may be defined by the app, and a purpose of the UI element may be to enable a user to interact with the app (after the user's intention to interact with the app is identified). In an aspect, a UI element may include one or more properties, such a location, a size, an orientation, a color, a transparency, or a brightness (as examples) of the UI element, a control style. In one or more implementations, an effect definition may include a modification of one or more properties, such as the location, the size, the orientation, the color, the transparency, or the brightness (as examples) of the UI element. For example, an effect definition for a button UI element may include a lift effect to raise a location property of the button and a brightening effect to increase a brightness property of the button. Furthermore, an app UI element may include predefined "remote states," where a remote state corresponds to predefined value(s) of the UI element's properties. A remote state of an app's UI element may be considered remote in that, while the app may define the UI element, its properties, and its remote states, only system components in a separate system process (such as rendering system 270 and effects component 280) may manage or have knowledge of the UI element's remote state. This may allow a user's preliminary interactions with the UI element to be rendered while remaining private from the app by preventing the app from discovering which remote state the UI element is in at any particular time.

In an aspect, the UI elements referenced throughout FIGS. 3A and 3B may also be obtained directly from the app or from alternate sources, such as the UI frameworks and file formats described above or from the operating system. These UI elements provided by alternate sources may act as a portion of an app's user interface (such the user interface of app 260 of FIG. 2). UI elements from alternate sources may have associated properties and "remote states" defined by the alternate source and/or defined by the app using it. For example, even though a UI element may originate from an alternate source, such a UI element may still be managed by the app using it to cause a system process to render remote effects while retaining privacy from the managing app.

In an aspect, UI elements may be specified as a layer tree or as a render tree. For example, application 260 may provide a layer tree or render tree of UI elements to rendering system 270, and application 260 may provide a definition of effects 252 including a layer tree or render tree of UI elements to an operating system or other component managing out-of-process UI effects.

The effect definition (box 302) may be received from a particular app running in an app process 350, and may describe an effect to be rendered on a UI element belonging to that particular app. However, implementations of this disclosure are not so limited. For example, the effect definition received in box 302 may be received indirectly from other sources, the effect definition may be a predetermined effect, or UI element may be a predetermined UI element. In one example, a button UI element may be predefined, and a "lift" effect may be predefined to occur when a gaze or hover user input is determined to correspond to the predefined button effect. In the case of predefined effects and/or predefined UI elements, the received effect definition may include a reference to the predefined elements without fully defining such element.

In an aspect, an effect definition may identify an effect to be rendered for a UI element by identifying a remote state (with predefined rendering property values) to be used when user input is determined to correspond to the UI element. In a further aspect, the effect definition may identify an animation to be used when transitioning between predefined remote states.

User input (such as is received in boxes 304 or 310 of FIG. 3) may include many types of input from a user. For example, in addition to user inputs received from user input devices such as a mouse, a keyboard, and/or an audio input device, received user input may also include location and/or orientation tracking of a user's body or body part (such as a fingertip or hand), gesture recognition (such a hand shape, hand motion, and/or a facial expression), or a location of a user's optical gaze (e.g., a gaze location 114). User input may include time or speed measurements, such as a gaze-dwell duration measuring a time duration that a user's gaze remains on or within a certain distance of a particular location or UI element, or hover-dwell measuring a time duration that a user hand or other body part remains within a certain two-dimensional or three-dimensional distance of a particular location or UI element.

In as aspect, UI effects (such as is defined in box 302 and rendered in box 308 of FIG. 3) may include any rendered output a user can sense, including audio, imagery, and/or tactile effects. An example of an audio effect on a UI element may include an audible sound designed to be perceived as emanating from the location of UI element, or a distortion of audio already emanating from the UI element before rendering of the audio effect. As an example of an imagery effect, a UI element may be displayed or otherwise visually presented to a user prior to rendering of the effect, and the rendered effect may change the appearance or location of UI element. For example, a glow effect may cause an existing UI element to glow. A highlight effect may add a new visual cue, such as a circle or check mark, near the location of the UI element. In an aspect, an effect definition may specify an "inverse" rendering effect, in which the specified effect is generally rendered except when a user input corresponds to the UI element.

In an aspect, identifying a correspondence between a user input and a first UI element (box 306) may include identifying a plurality of user interface elements that the UI element may intersect with, and then determining that the plurality of identified UI elements includes the first UI element. For example, user input may be a gaze location. The system process may perform a hit-testing process (e.g., hit-testing 282) including identifying a list of potential UI elements that the user may be attempting to interact with, such as by identifying all UI elements from all applications that are located within a threshold distance of the gaze location and/or identifying all UI elements with which gaze direction intersects. If an effect definition includes an app UI element that is in that list, then the corresponding effect may be rendered on that app UI element. In a use case in which the gaze direction intersects with multiple UI elements each having effect definitions, the system process may render the effect on the UI element, among the multiple UI elements, that is displayed to appear closest to the user among the multiple UI elements and/or on the UI element, among the multiple UI elements, with which the gaze location most centrally intersects.

In an aspect, a single effect may be defined for a group of UI elements. For example, when user input correspondence is determined (306) for any of the UI elements in the group, the defined effect may be rendered on all UI elements in the group. In another example, user input correspondence in box 306 may be determined by only a subset of the UI elements in the group. The definition of an effect for a group of UI elements may include an indication of a which subset of UI elements in the group to hit-test against. If a user input location (such as a location of a user's gaze or hand gesture) is within a certain proximity (e.g., a predefined distance defined by the system process or in the effects definition) of any element in the indicated subset of UI elements, the effect may be rendered on all UI elements in the group (e.g., unless a foreground UI window or foreground UI element having a foreground control style has been defined and displayed).

In an aspect, a single effect definition may define a group of rendered effects. When correspondence to the UI element is determined (box 306), the UI element may be rendered with multiple different effects (box 308). For example, an effect definition for a button may include a combination of a lift effect (e.g., a movement of the button in a direction opposite pressing the button), a glow effect (e.g., brighten) and an audio cue (e.g., an audio tone emanating from the button).

In an aspect, an effect definition may combine multiple aspects described above. For example, a single effect definition may include multiple UI elements, multiple effects to render, and/or multiple types of user input that may trigger the rendering of the one or more effects.

In an aspect, only a summary or a subset of user input may be provided to the app (box 314), even after identifying a user's intention to interact with the app (box 312). For example, once a user's gaze-dwell time on an app button is greater than a threshold, the intention to interact with the app may be identified. However, instead of providing the user's gaze location or gaze dwell time to the app, the app may be provided with an indication that the user intended to press the app button without providing the app any knowledge about the user's gaze.

A list selection UI may be used to illustrate a more complex example of out-of-process effects that combines various aspects described above. A common list-selection UI task may include presenting a list of several options to a user, including an indication of a current selection. Examples of a list selection UI include a "combo box" in MacOS or a "drop-down list box" in Windows. Each of the options in the list may be rendered, for example, as a visual box containing text describing the option, and the list may be presented as a row of text boxes all without a highlight except a current selection highlighted with a first color.

In an example out-of-process implementation of a list selection UI, an application 260 may provide definitions of UI elements 250 including a row of text boxes to rendering system 270. The definition of each text box may include three predefined remote states including: 1) an unselected (idle) remote state with a highlight property set to a first color (or no highlight); 2) a current selection remote state with the highlight property set to a second color; and 3) a preliminary selection remote state with a highlight property set to a third color. The application 260 may further provide an indication that a first text box of the list is a current selection and application 260 may provide effects component 280 with definition of effects 252 that indicate how preliminary user input should affect the remote state of the text boxes. The rendering system 270 may render the list of text boxes each with its corresponding remote state, and the rendering system 270 may provide the definitions of text boxes via UI elements 258 message to the effects component 280 along with the current locations of each text box. Effects component 280 may use these definitions to manage the remote states of the text boxes. When effects component 280 receives user input including a location (e.g., a gaze location or location of a hand gesture), and effects component 280 may perform hit-testing of the user input location against the locations of the text boxes to determine a correspondence between the user input and one of the rendered text boxes. When the user input location correspond to the second text box in the list which is different from the currently selected first text box, the effects component 280 may cause rendering system 270 to render an effect 256 including a change in highlight property from the unselected remote state to a preliminary selection remote state, without notifying the app of the user input location or the change in remote state and highlight property of the second text box.

Alternately or in addition to the preliminary selection above, when user input indicates a user's completed selection, the app may be notified of the user's intent to change the current selection in the list. For example, after rendering the preliminary selection above and in response to receiving additional user input (box 310) that identifies the user's intention to change the current selection to the second box (for example, when a gaze-dwell duration threshold is exceeded on the second box, or a button press gesture occurs on the second box), the app may be notified of the user's intent to change the current selection in the list.

In an aspect, a remote effect definition may specify an animation for rendering when transitioning between remote states. For example, in the list selection UI example above, a remote state transition animation may be defined from the unselected remote state to the preliminary selection remote state to include a fading transition from the first color of highlight (no highlight for idle state) to the third color of highlight (for preliminary selection state).

FIG. 3B illustrates an example method for rendering UI effects, in accordance with aspects of the subject disclosure. As shown, the method of FIG. 3B may include identifying, by an app process 350, app-managed rendering effect(s) and remote rendering effect(s) (box 552) for corresponding UI elements. A definition of the identified remote rendering effect(s) may be provided, by the app process 350 (box 554), to a remote effect rendering service provider (such as rendering system 270 and/or effects component 280 of FIG. 2). User input may be received (box 556), by the app process 350, for a UI element with a corresponding app-managed effect. The app-managed UI effect may be rendered (box 558) by the app process 350 on its corresponding UI element. In one or more implementations, the app-managed UI effect, and/or one or more application functions performable by the app in response to user inputs, may be performed by the app process 350 based on which portions of an application's UI (e.g., which UI element) was interacted with by the user input. In one or more implementations, when a foreground control style is defined by the app process 350 and provided (554) to the system process 300, the user input received at box 556 may be received in connection with a different UI window or UI element (e.g., a foreground UI window having the foreground control style defined) from the UI window or UI element at which the system process 300 detected the user input.

In an aspect, the operations of method of FIG. 3B may be performed in an app process 350, separate from a system process 300 in which the remote/out-of-process UI effects are managed. In another aspect, the method of FIG. 3A may be an example method for providing a remote effect rendering service, and the effect definition provided in box 554 may be received at box 302. In yet another aspect, the additional user input provided in box 314 may be received at box 556. In one or more implementations, the effect definition provided in box 554 and received at box 556 may include a control style for a portion of a UI, such as for a particular UI window of an application UI (e.g., a foreground window).

In other aspects, effects for preliminary user interactions may be identified as remote-UI effects, while effects for confirmed user inputs may be identified as app-managed-UI effects (box 552). In one or more implementations, app-managed UI effects based on confirmed user inputs may be managed, by the application, based on the location of the user input (e.g., as provided in box 314). In one or more implementations described in further detail hereinafter, the system process 300 may provide a re-directed user input, received at one location on the application UI, to the application in association with a different location on the application UI (e.g., on a foreground UI window for which a foreground control style has been provided). In the list-selection UI example described above, the preliminary selection rendering effect may be identified as a remote-UI effect, while a completed selection rendering effect may be identified as an app-managed UI effect.

Figure 4:
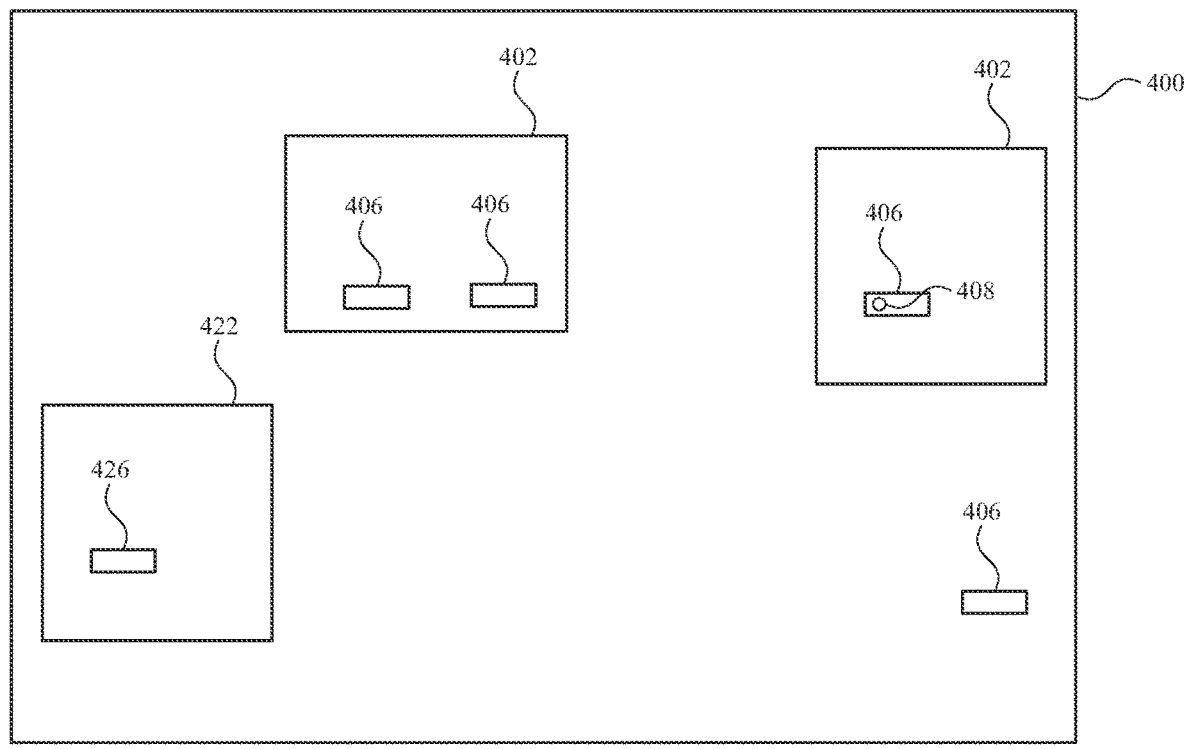
FIG. 4 illustrates an example use case in which multiple UI windows of multiple applications are concurrently displayed, in accordance with aspects of the subject disclosure.

FIG. 4 illustrates an example use case in which one or more UI windows 402 of an application, such as application 260, are displayed in a viewable display area 400 of the computing device 120 (e.g., a viewable area of the display 115 of the computing device 120). For example, the display 115 (see, e.g., FIG. 1) of the computing device 120 may be operable to display, in a viewable display area 400 of the display 115, one or more user interface windows 402 corresponding to an underlying application (e.g., app 260) running at the computing device 120. As shown, the computing device 120 may also display a UI window 422 of another underlying application running at the computing device 120.

As shown, the user interface windows 402 of the application 260 may include one or more user interface elements 406. As shown, the user interface window 422 may also include one or more user interface elements 426. As examples, the user interface elements 406 and/or the user interface elements 426 may include virtual buttons, virtual switches, virtual lists (e.g., drop-down lists), tabs, scrollbars, application icons, and/or other interactable elements. As shown in FIG. 4, in one or more implementations, a user interface element 406 of the application 260 may be displayed separately from a user interface window 402. For example, in FIG. 4, a user input is received at a location 408 corresponding to a user interface element 406 within one of the UI windows 402 of the application 260.

As described herein, a system process 300 may render one or more effects for a user interface element 406 when the user input to the computing device 120 is received at the location 408 of a UI element 406 (e.g., when the user's gaze location 114 falls within the boundary of the UI element 406 or within a range of the boundary of the UI element 406, and/or when a user's hand or finger hovers over a location within the boundary of the UI element 406 or within a range of the boundary of the UI element 406, such as for a predetermined amount of time). As described herein, these effects can be out-of-process effects, pre-defined by the underlying application for the UI element 406, that are rendered without providing user information (e.g., the location of the user input) to the application.

Figure 5:
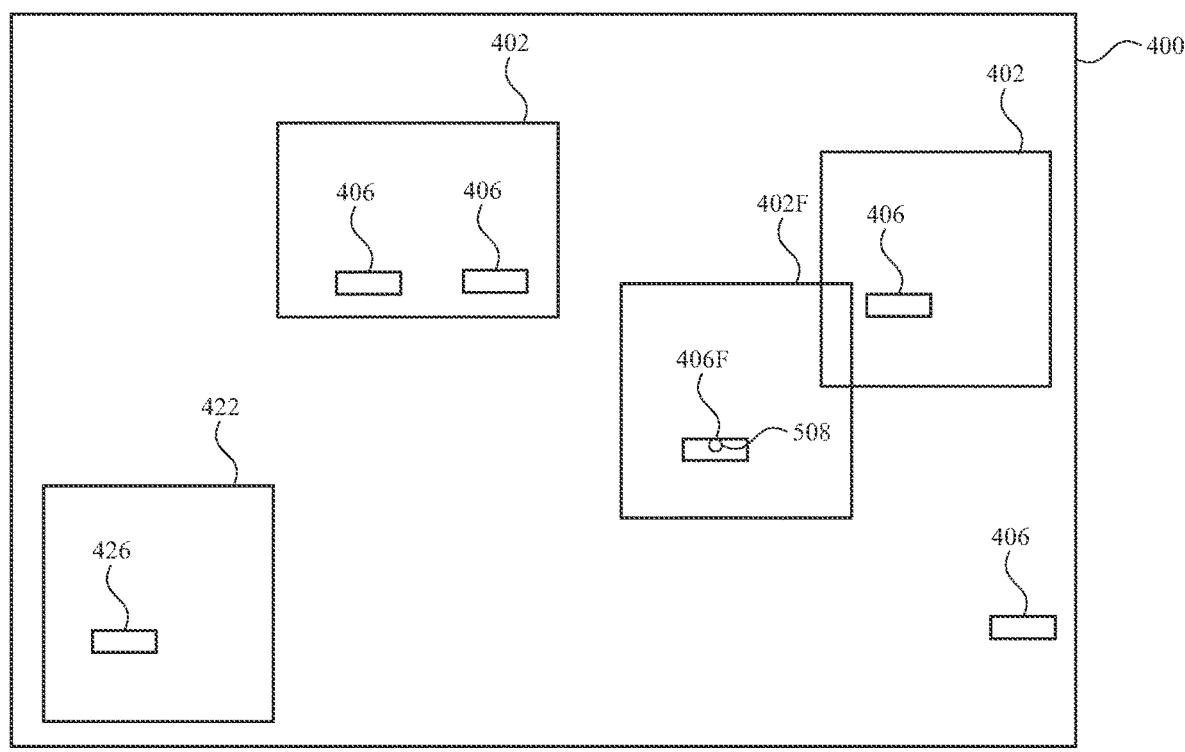
FIG. 5 illustrates an example use case in which a foreground UI window is displayed, in accordance with aspects of the subject disclosure.

In one or more implementations, a user input to a user interface element 406, and/or another interaction with an application UI, may cause a foreground window of the application UI to be presented. For example, FIG. 5 illustrates an example use case in which a foreground window 402F of the application 260 is displayed in the viewable display area 400 (e.g., along with other parts of the application UI, such as other UI windows 402 and/or UI elements 406 managed by the same application 260). For example, the foreground window 402F may have been opened responsive to the user input to the UI element 406 in FIG. 4 (e.g., at the location 408). As illustrative examples, the foreground window 402F may include a share sheet for sharing (e.g., sending) application-related content to a remote device, a toolbar or palette for editing text displayed by the application 260, a purchase interface for making an in-application purchase via the application 260, or any other pop-up or popover window that can be provided by an application. While the foreground window 402F is displayed, foreground window 402F may have foreground functionality with respect to the other UI windows 402 and UI elements 406 of the application 260. For example, the foreground window 402F may have a foreground functionality defined by a foreground control style that specifies or otherwise indicates a priority for receiving user inputs over the other UI windows 402 and UI elements 406 of the application 260.

As indicated in FIG. 5, hit-testing (e.g., hit-testing 282) by the system process 300 may determine that the location 508 of the user input is a location that corresponds to a foreground user interface element 406F of the foreground window 402F. For example, the user input at the location 508 may be a preliminary user input, such as a gaze or a hover of a hand or input device (e.g., for less than a predetermined amount of time, such as a dwell time). In this example, the user input at the location 508 may cause the system process 300 (e.g., without providing any information about the user input or the location 508 to the application) to provide an out-of-process or remote effect (e.g., a visual effect or an audio effect) on the foreground UI element 406F, as described herein. In another example, the user input at the location 508 may be a confirmed user input (e.g., including a detected a pinch or click gesture, a pinch or click gesture combined with a gaze, or a gaze or hover for at least a predetermined amount of time, such as a dwell time) and may cause the system process 300 to provide an indication of the user input, at the foreground UI element 406F within the foreground window 402F, to the application 260. In this other example, the application 260 may determine how to process the user input (e.g., by closing the foreground window and/or performing one or more application operations corresponding to the foreground UI element 406F, such as initiating playback of a song or other audio content, changing the appearance of text displayed by the application, making a purchase, or performing any other application functionality).

In the example of FIG. 5, a foreground window 402F is displayed, and a user input is received at a location 508 within the foreground window 402F. However, in other use cases, while the foreground window 402F is displayed, user inputs can be received at locations other than within the foreground window 402F. However, it can be challenging to avoid providing user inputs to the other UI windows 402 and/or UI elements 406 of the application 260 while the foreground window 402F is displayed, in some use cases and/or systems.

For example, in a smartphone, a tablet, a laptop, or a desktop computer implementation of the computing device 120 in which the viewable display area is limited to the physical area of the display itself, the computing device may generate a non-visible display layer over the entire viewable display area between the foreground window 402F and all other display content, the non-visible display layer configured to receive any user inputs outside of the foreground window 402F. However, in systems with large displays and/or systems that display three-dimensional environments in which display content appears, to the user, to be at locations remote from the display itself, displaying such a virtual layer over the entire viewable display area can be undesirable, inefficient, or even ineffective.

For example, in the example of FIG. 5, the foreground window 402F is displayed at least partially in front of one of the UI windows 402. In the example of FIG. 5, the foreground window 402F is spatially separated from another UI window 402. In the example of FIG. 5, the foreground window 402F is spatially separated from a standalone UI element 406 of the application 260. In the example of FIG. 5, the foreground window 402F is spatially separated from the UI window 422 of the other application. With these and other arrangements of UI windows and/or elements, it can be challenging to determine how to process user inputs at locations other than within the foreground window 402F, when a foreground window 402F is displayed. This can be particularly challenging, for example, in use cases in which the UI windows 402, the UI elements 406, the foreground window 402F, and/or the foreground UI element 406F are displayed so as to appear at respective locations, remote from the computing device 120 (e.g., remote from the display 115 of the computing device 120), in three-dimensions.

Figure 6:
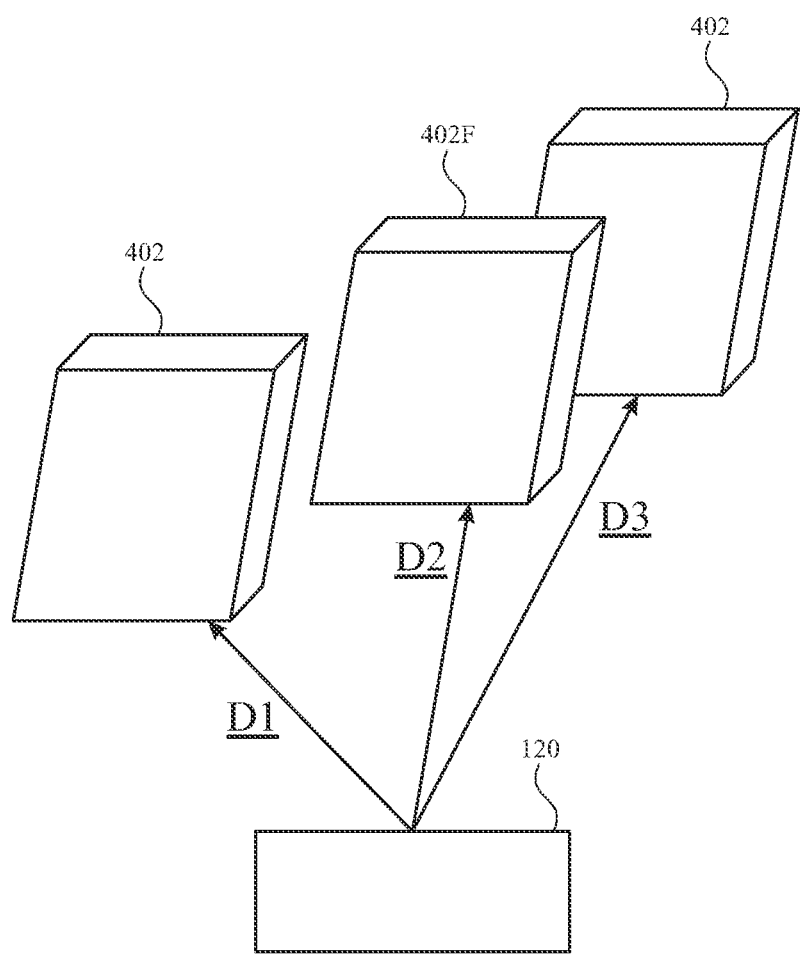
FIG. 6 illustrates an example use case in which UI windows, including a foreground UI window, are displayed to appear to be distributed in three-dimensions, in accordance with aspects of the subject disclosure.

For example, FIG. 6 illustrates how, in one or more use cases, the foreground UI element 406F may be displayed to appear at least partially in front of one UI window 402 and spatially separated from another UI window 402, and that (in some examples) the other UI window 402 may still appear to be closer to the user, the computing device 120 and/or the display 115 than the foreground window 402F, even when the foreground window 402F has foreground functionality with respect to all of the other UI windows 402 and/or UI elements 406 of the application 260.

Aspects of the subject technology provide for out-of-process hit-testing that can determine how to handle user inputs (e.g., including preliminary and/or confirmed user inputs as described herein) when a foreground window 402F is displayed together with one or more other UI windows and/or UI elements 406 of an underlying application, such as the application 260.

Figure 7:
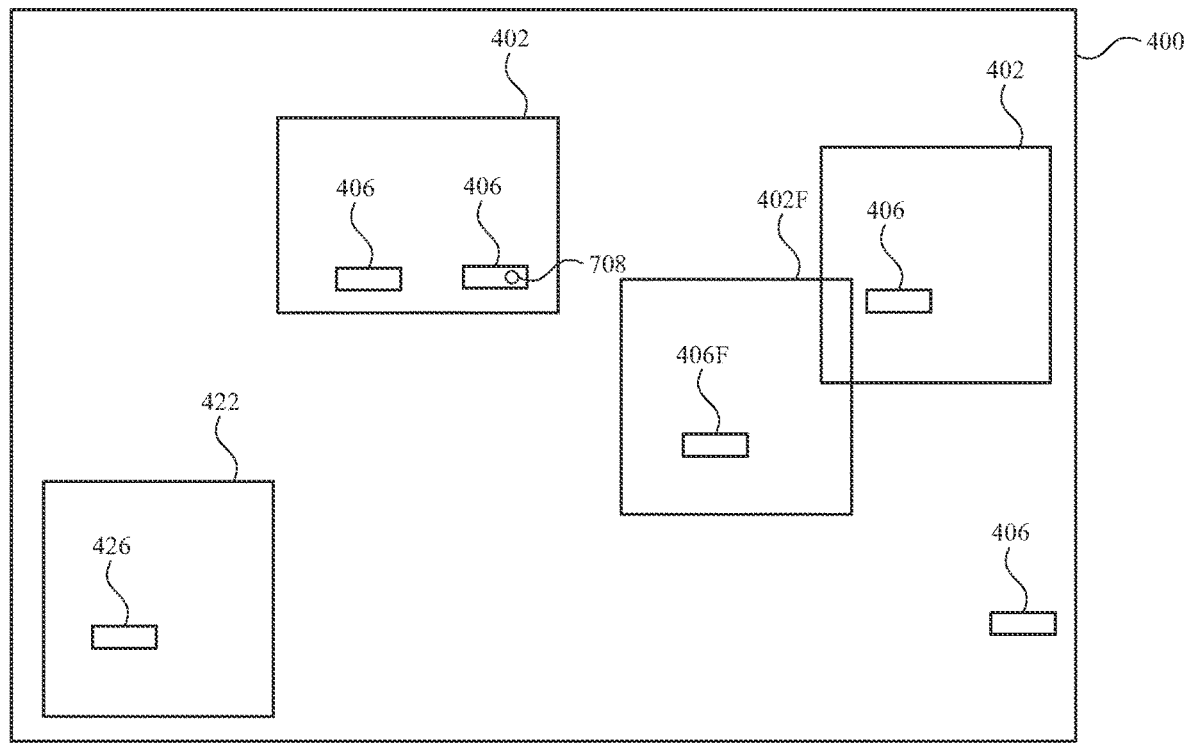
FIG. 7 illustrates an example use case in which a user input is received at a UI element while a foreground window is displayed, in accordance with aspects of the subject disclosure.

For example, FIG. 7 illustrates a use case in which, while a foreground window 402F is displayed, a user input is received at a location 708 that corresponds to another UI window 402 of the same application (e.g., as determined based on hit-testing 282 by the system process 300 as described herein). In this example, the system process 300 may detect the user input at the location 708. The system process 300 may then, rather than providing a remote effect on the UI element 406 at the location 708 (e.g., if the user input is a preliminary user input) or rather than providing an indication of the user input to the application 260 underlying the UI window 402 in connection with the UI element 406 at the location 708 (e.g., if the user input is a confirmed user input), redirect the user input to the foreground window 402F (e.g., by providing an indication of the user input to the application 260 in connection with the foreground window 402F).

In a use case in which the user input that is received while the foreground window 402F is displayed is (e.g., as determined by the system process 300) is a preliminary user input, the system process 300 may abstain from providing (e.g., may not provide) a previously defined remote effect on the UI element 406 at which the user input was received.

In a use case in which the user input that is received while the foreground window 402F is displayed is (e.g., as determined by the system process 300) is a confirmed user input, the application that receives the re-directed indication of the user input in connection with the foreground window 402F may then determine whether to take any action and/or what action to take responsive to the user input. For example, the application 260 may close the foreground window 402F in response to the user input at the location 708, or the application 260 may take no action with respect to the foreground window 402F. In order to provide this foreground functionality for the foreground window 402F, the application 260 may provide a definition of a control style (e.g., a foreground control style) that defines the foreground functionality, to the system process 300 (e.g., in the remote definition of box 554).

Figure 8:
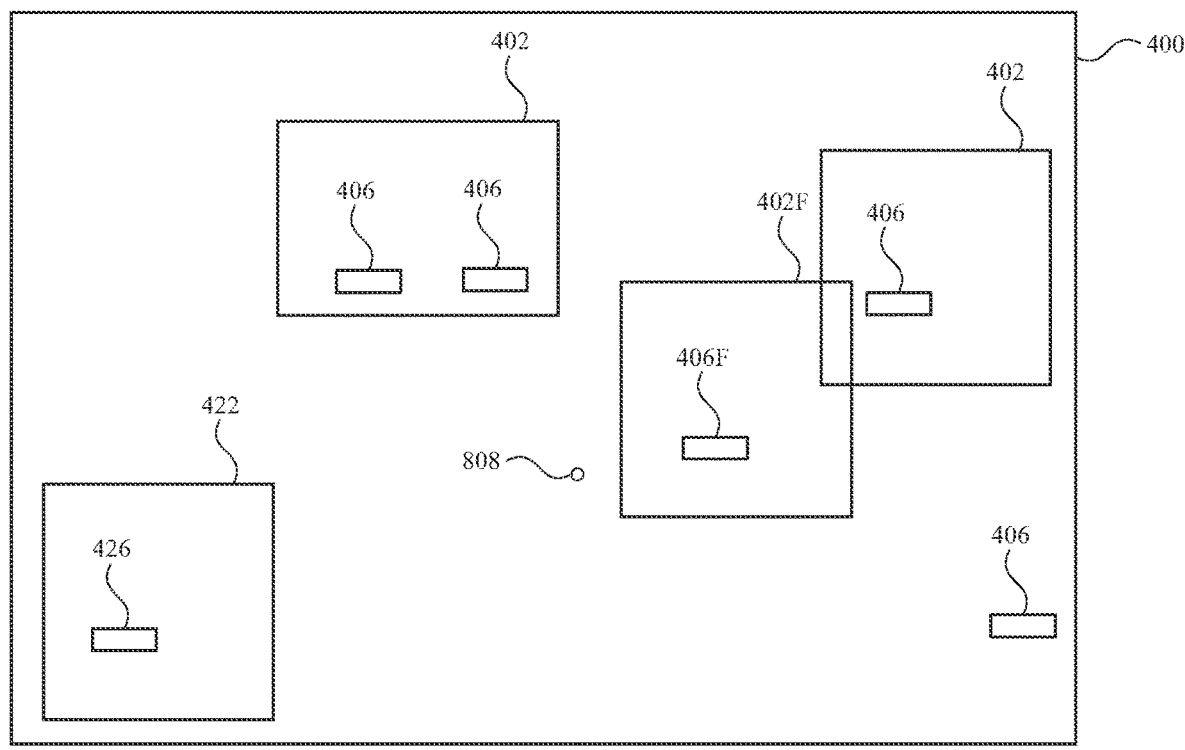
FIG. 8 illustrates an example use case in which a user input is received at a location away from application UI elements while a foreground UI window is displayed, in accordance with aspects of the subject disclosure.

FIG. 8 illustrates another example use case, in which a user input is received at a location separate from any of the UI windows and/or elements of the application 260 (review claim language). For example, the user may be gazing or gesturing at a location in a free (e.g., empty) area between the various application UIs and/or elements. In this example use case, whether the user input at the location 808 is determined (e.g., by the system process 300) to be a preliminary user input or a confirmed user input, the system process 300 may prevent any information about the user input from being provided to the application 260.

Figure 9:
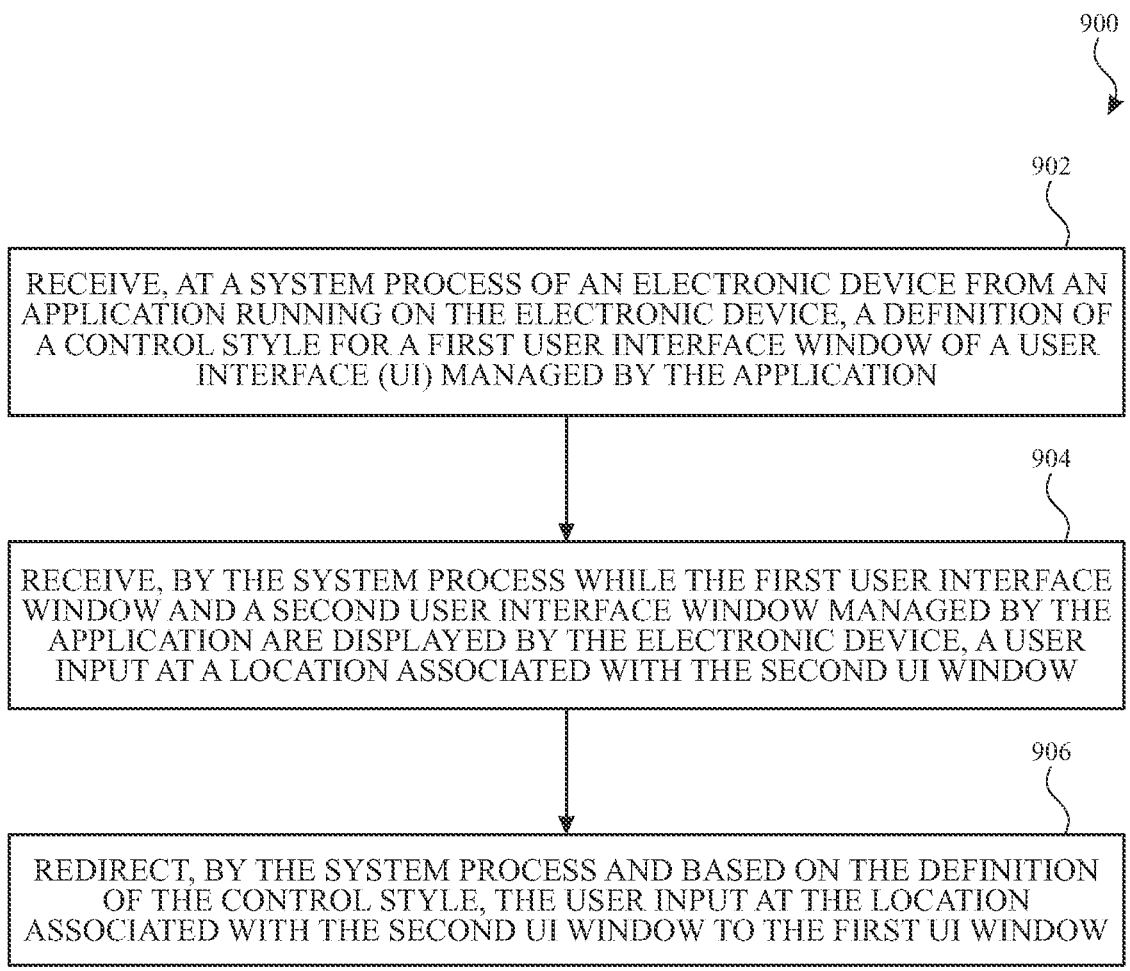
FIG. 9 illustrates a flow chart of illustrative operations that may be performed for providing out-of-process hit-testing, in accordance with aspects of the subject disclosure.

FIG. 9 illustrates an example process 900 for providing out-of-process hit-testing, in accordance with one or more implementations. For explanatory purposes, the process 900 is primarily described herein with reference to the computing device 120 of FIG. 1. However, the process 900 is not limited to the computing device 120 of FIG. 1, and one or more blocks (or operations) of the process 900 may be performed by one or more other components of other suitable devices. Further for explanatory purposes, some of the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

In the example of FIG. 9, at block 902, an electronic device (e.g., the computing device 120) may receive, at a system process (e.g., system process 300) of an electronic device from an application (e.g., application 260) running on the electronic device, a definition of a control style (e.g., foreground control style) for a first user interface window (e.g., a foreground UI window, such as foreground UI window 402F) of a user interface (UI) managed by the application. In one or more implementations, the definition of the control style may be a declarative definition that includes an identification of the first UI window (and/or an UI element thereof) to which the control style applies, an identification of the user input, and redirection instructions for redirecting the user input to the first UI window (and/or the UI element thereof) to which the control style applies when the user input is received (e.g., at the location of other UI windows and/or elements of the same application). In one or more other implementations, the control style may be a control style flag or other value or parameter that indicates, to the system process, that user inputs associated with other portions of an application UI of the application should be redirected to the first UI window (and/or the UI element thereof) to which the control style applies whenever the first UI window (and/or the UI element thereof) is displayed.

At block 904, the system process may receive, while the first user interface window and a second user interface window (e.g., a UI window 402 or an UI element 406) managed by the application are displayed by the electronic device, a user input at a location (e.g., a location 708) associated with the second UI window. For example, the location associated with the second UI window may be a location that has been determined, by the system process (e.g., using a hit-testing operation such as hit-testing 282 as described herein) to intersect with the second UI window and/or a UI element thereof).

In one or more implementations, the first user interface window may be displayed to appear at least partially in front of the second user interface window. In one or more implementations, the first user interface window may be spatially separated from the second user interface window. In one or more implementations, the first user interface window and the second user interface window may be displayed to appear at first and second respective locations that are remote from the electronic device, and the second respective location of the second user interface window may be closer to the electronic device than the first respective location of the first user interface window (e.g., as in the example of FIG. 6).

At block 906, the system process may redirect, based on the definition of the control style, the user input at the location associated with the second UI window to the first UI window. For example, redirecting the user input at the location associated with the second UI window to the first UI window may include providing, by the system process to the application, an indication of the user input in association with a different location (e.g., different from the location at which the user input was received), the different location corresponding to the first UI window. As another example, redirecting the user input at the location associated with the second UI window to the first UI window may include providing, by the system process to the application, an indication of the user input and an indication to process the user input in association with the first UI window (e.g., without providing the location associated with the second UI window to the application).

In one or more implementations, the process 900 may also include (e.g., before or after receiving the user input that is redirected to the first UI window, such as before the first UI window is opened or after the first UI window is closed) receiving another user input at the location associated with the second UI window (e.g., the same location 708) while the second UI window is displayed and the first UI window is not displayed; and providing the other user input to the second UI window (e.g., by providing an indication to the application 260 that the other user input was received at a UI element at the location 708, such as without providing the location 708 to the application).

In one or more implementations, the process 900 may also include (e.g., before or after receiving the user input that is redirected to the first UI window, such as before the first UI window is opened or after the first UI window is closed) receiving another user input (e.g., a preliminary user input, such as a user gaze) at the location associated with the second UI window (e.g., the same location 708) while the second UI window is displayed and the first UI window is not displayed; and generating, by the system process responsive to the other user input at the location associated with the second UI window while the second UI window is displayed and the first UI window is not displayed, a visual or audio effect (e.g., a remote effect as described herein) for an element (e.g., the UI element 406 coinciding with the location 708) of the second UI window, the visual or audio effect based on another definition previously provided to the system process (e.g., at box 554) by the application. In one or more implementations, while the first user interface window and the second user interface window managed by the application are displayed by the electronic device, the system process may also abstain from providing the visual or audio effect for the element of the second UI window responsive to the user input received at the location associated with the second UI window.

In one or more implementations, the electronic device (e.g., the application 260) may, responsive to receiving the redirected user input by the first user interface window, close the first user interface window. In one or more implementations, the electronic device (e.g., the application 260) may, responsive to receiving the redirected user input by the first user interface window, ignore the user input (e.g., the application 260 may take no action responsive to the user input).

In one or more implementations, the system process may receive, while the first user interface window and the second user interface window managed by the application are displayed by the electronic device, another user input at another location (e.g., a location 808) unassociated with the first user interface window or the second user interface window; and abstain from providing the other user input to the application (e.g., as described herein in connection with FIG. 8).

As described above, one aspect of the present technology is the gathering and use of data available from specific and legitimate sources for providing out-of-process hit-testing for electronic devices. The present disclosure contemplates that in some instances, this gathered data may include personal information data that uniquely identifies or can be used to identify a specific person. Such personal information data can include audio data, voice data, demographic data, location-based data, online identifiers, telephone numbers, email addresses, home addresses, encryption information, data or records relating to a user's health or level of fitness (e.g., vital signs measurements, medication information, exercise information), date of birth, or any other personal information.

The present disclosure recognizes that the use of personal information data, in the present technology, can be used to the benefit of users. For example, the personal information data can be used for providing out-of-process hit-testing for electronic devices.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the example of providing out-of-process hit-testing for electronic devices, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 10:
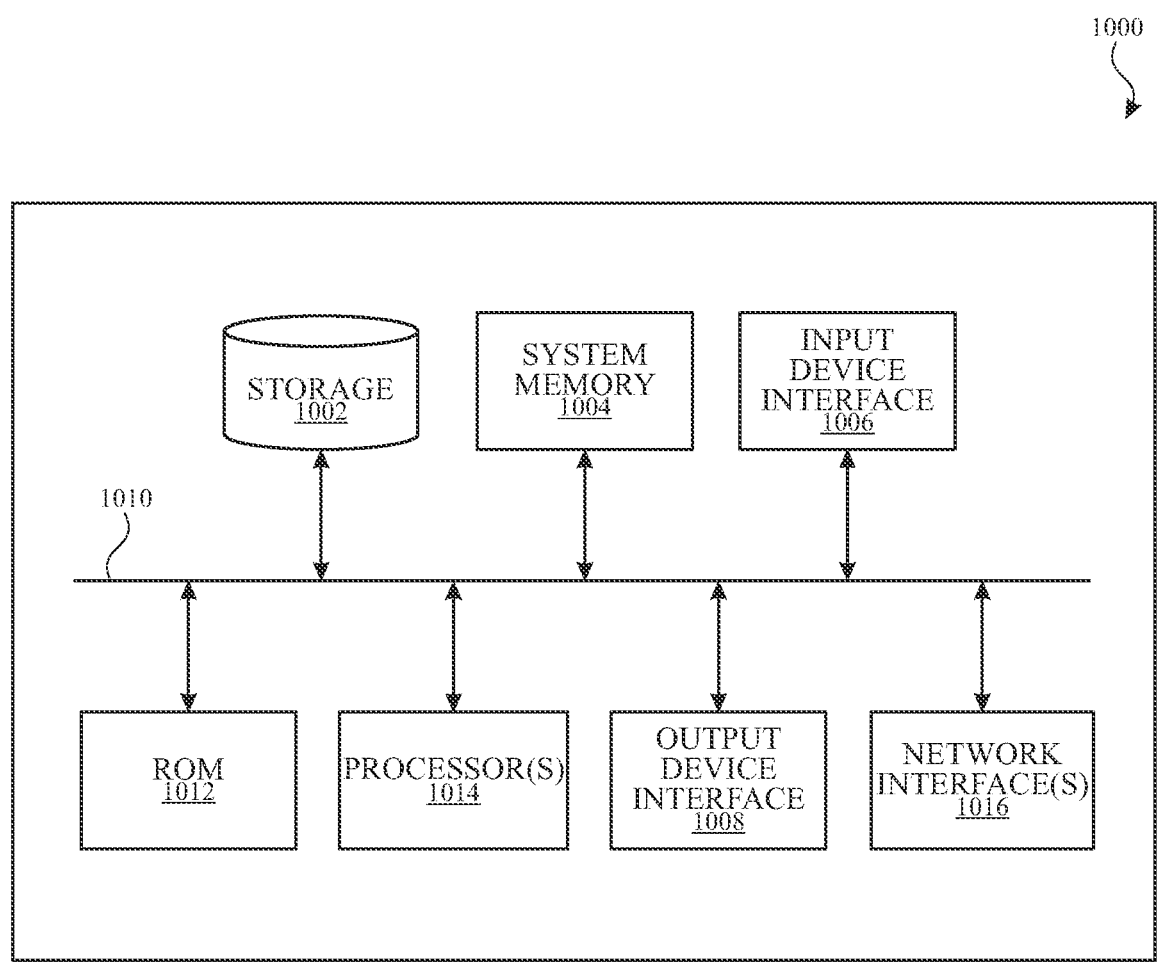
FIG. 10 illustrates an example computing device on which aspects of this disclosure may implemented.

FIG. 10 illustrates an example computing device 1000 with which aspects of the subject technology may be implemented in accordance with one or more implementations. The computing device 1000 can be, and/or can be a part of, any computing device or server for generating the features and processes described above, including but not limited to a laptop computer, a smartphone, a tablet device, a wearable device such as a goggles or glasses, and the like. The computing device 1000 may include various types of computer readable media and interfaces for various other types of computer readable media. The computing device 1000 includes a permanent storage device 1002, a system memory 1004 (and/or buffer), an input device interface 1006, an output device interface 1008, a bus 1010, a ROM 1012, one or more processing unit(s) 1014, one or more network interface(s) 1016, and/or subsets and variations thereof.

The bus 1010 collectively represents all system, peripheral, and chipset buses that communicatively connect the numerous internal devices of the computing device 1000. In one or more implementations, the bus 1010 communicatively connects the one or more processing unit(s) 1014 with the ROM 1012, the system memory 1004, and the permanent storage device 1002. From these various memory units, the one or more processing unit(s) 1014 retrieves instructions to execute and data to process in order to execute the processes of the subject disclosure. The one or more processing unit(s) 1014 can be a single processor or a multi-core processor in different implementations.

The ROM 1012 stores static data and instructions that are needed by the one or more processing unit(s) 1014 and other modules of the computing device 1000. The permanent storage device 1002, on the other hand, may be a read-and-write memory device. The permanent storage device 1002 may be a non-volatile memory unit that stores instructions and data even when the computing device 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random-access memory. The system memory 1004 may store any of the instructions and data that one or more processing unit(s) 1014 may need at runtime. In one or more implementations, the processes of the subject disclosure are stored in the system memory 1004, the permanent storage device 1002, and/or the ROM 1012. From these various memory units, the one or more processing unit(s) 1014 retrieves instructions to execute and data to process in order to execute the processes of one or more implementations.

The bus 1010 also connects to the input and output device interfaces 1006 and 1008. The input device interface 1006 enables a user to communicate information and select commands to the computing device 1000. Input devices that may be used with the input device interface 1006 may include, for example, alphanumeric keyboards and pointing devices (also called "cursor control devices"). The output device interface 1008 may enable, for example, the display of images generated by computing device 1000. Output devices that may be used with the output device interface 1008 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1010 also couples the computing device 1000 to one or more networks and/or to one or more network nodes through the one or more network interface(s) 1016. In this manner, the computing device 1000 can be a part of a network of computers (such as a LAN, a wide area network ("WAN"), or an Intranet, or a network of networks, such as the Internet. Any or all components of the computing device 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving, at a system process of an electronic device from an application running on the electronic device, a definition of a control style for a first user interface window of a user interface (UI) managed by the application;
   receiving, by the system process while the first user interface window and a second user interface window managed by the application are displayed by the electronic device, a user input at a location associated with the second UI window; and
   redirecting, by the system process and based on the definition of the control style, the user input at the location associated with the second UI window to the first UI window.

2. The method of claim 1, further comprising:
   receiving an other user input at the location associated with the second UI window while the second UI window is displayed and the first UI window is not displayed; and
   providing the other user input to the second UI window.

3. The method of claim 1, further comprising:
   receiving an other user input at the location associated with the second UI window while the second UI window is displayed and the first UI window is not displayed; and
   generating, by the system process responsive to the other user input at the location associated with the second UI window while the second UI window is displayed and the first UI window is not displayed, a visual or audio effect for an element of the second UI window, the visual or audio effect based on another definition previously provided to the system process by the application.

4. The method of claim 3, further comprising, while the first user interface window and the second user interface window managed by the application are displayed by the electronic device, abstaining from providing the visual or audio effect for the element of the second UI window responsive to the user input received at the location associated with the second UI window.

5. The method of claim 1, wherein the first user interface window is displayed to appear at least partially in front of the second user interface window.

6. The method of claim 1, wherein the first user interface window is spatially separated from the second user interface window.

7. The method of claim 1, wherein the first user interface window and the second user interface window are displayed to appear at first and second respective locations that are remote from the electronic device, and wherein the second respective location of the second user interface window is closer to the electronic device than the first respective location of the first user interface window.

8. The method of claim 1, further comprising, responsive to receiving the redirected user input by the first user interface window, closing the first user interface window.

9. The method of claim 1, further comprising, responsive to receiving the redirected user input by the first user interface window, ignoring the user input.

10. The method of claim 1, further comprising:
    receiving, by the system process while the first user interface window and the second user interface window managed by the application are displayed by the electronic device, an other user input at an other location unassociated with the first user interface window or the second user interface window; and abstaining from providing the other user input to the application.

11. A non-transitory computer readable medium storing instructions that, when executed by one or more processors, cause the one or more processors to perform operations comprising:

receiving, at a system process of an electronic device from an application running on the electronic device, a definition of a control style for a first user interface window of a user interface (UI) managed by the application;

receiving, by the system process while the first user interface window and a second user interface window managed by the application are displayed by the electronic device, a user input at a location associated with the second UI window; and redirecting, by the system process and based on the definition of the control style, the user input at the location associated with the second UI window to the first UI window.

12. The non-transitory computer readable medium of claim 11, the operations further comprising:

receiving an other user input at the location associated with the second UI window while the second UI window is displayed and the first UI window is not displayed; and providing the user input to the second UI window.

13. The non-transitory computer readable medium of claim 11, the operations further comprising:

receiving an other user input at the location associated with the second UI window while the second UI window is displayed and the first UI window is not displayed; and generating, by the system process responsive to the user input at the location associated with the second UI window while the second UI window is displayed and the first UI window is not displayed, a visual or audio effect for an element of the second UI window, the visual or audio effect based on another definition previously provided to the system process by the application.

14. The non-transitory computer readable medium of claim 13, the operations further comprising, while the first user interface window and the second user interface window managed by the application are displayed by the electronic device, abstaining from providing the visual or audio effect for the element of the second UI window responsive to the user input received at the location associated with the second UI window.

15. The non-transitory computer readable medium of claim 11, wherein the first user interface window is displayed to appear at least partially in front of the second user interface window.

16. The non-transitory computer readable medium of claim 11, wherein the first user interface window is spatially separated from the second user interface window.

17. The non-transitory computer readable medium of claim 11, wherein the first user interface window and the second user interface window are displayed to appear at first and second respective locations that are remote from the electronic device, and wherein the second respective location of the second user interface window is closer to the electronic device than the first respective location of the first user interface window.

18. The non-transitory computer readable medium of claim 11, the operations further comprising, responsive to receiving the redirected user input by the first user interface window, closing the first user interface window or ignoring the user input.

19. An electronic device, comprising:

a memory; and one or more processors configured to:

receive, at a system process of the electronic device from an application running on the electronic device, a definition of a control style for a first user interface window of a user interface (UI) managed by the application;

receive, by the system process while the first user interface window and a second user interface window managed by the application are displayed by the electronic device, a user input at a location associated with the second UI window; and redirect, by the system process and based on the definition of the control style, the user input at the location associated with the second UI window to the first UI window.

20. The electronic device of claim 19, wherein redirecting the user input at the location associated with the second UI window to the first UI window comprises providing, by the system process, an indication of the user input in association with a different location, the different location corresponding to the first UI window.

* * * * *